No. 609,130. Patented Aug. 16, 1898.
A. D. TYLER, Jr.
SHOE TREEING MACHINE.
(Application filed Sept. 2, 1897.)
(No Model.)
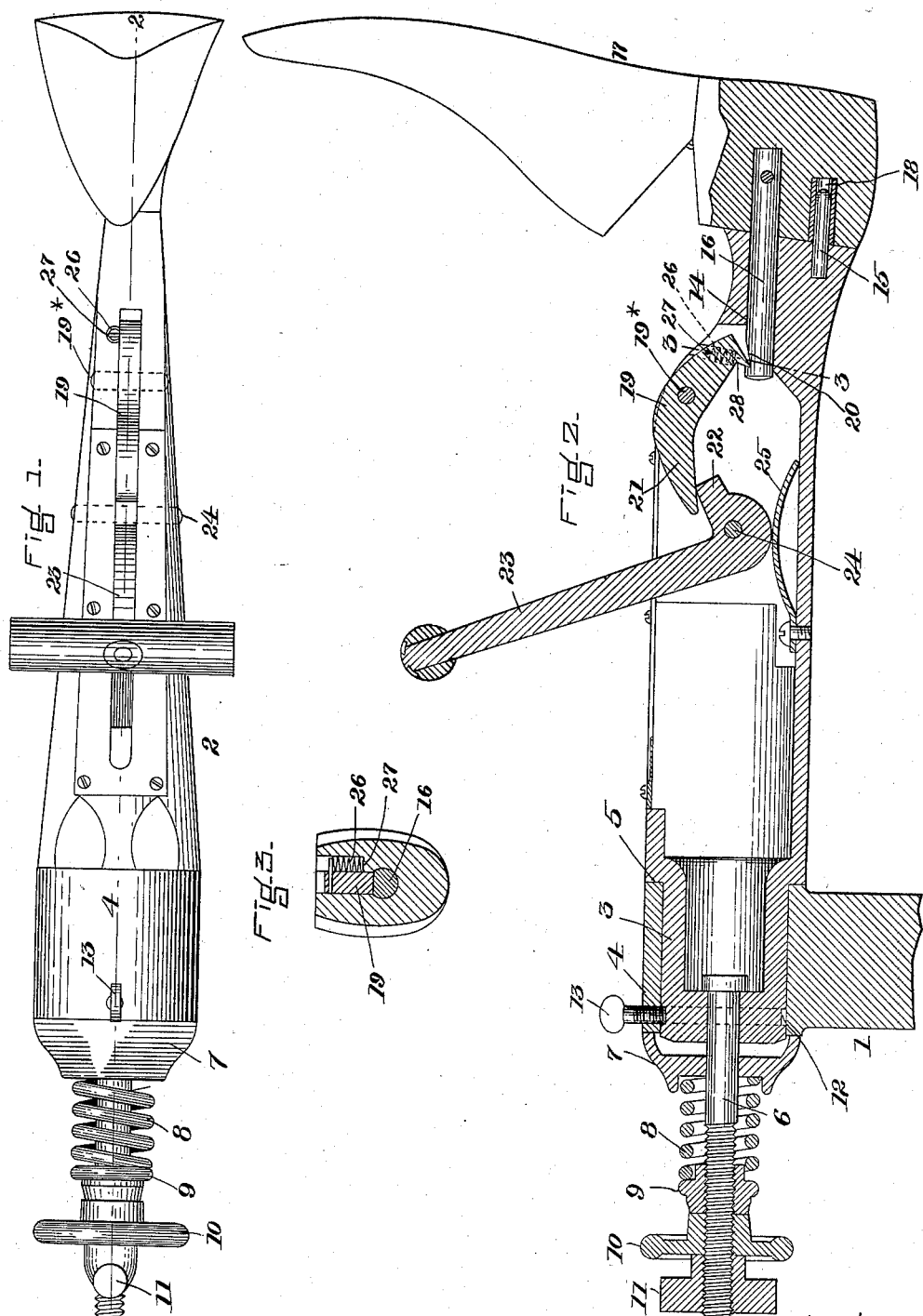
WITNESSES.
Fred E. Dorr.
INVENTOR
Abel D. Tyler, Jr.
by his attorney
Edward S. Beach.

UNITED STATES PATENT OFFICE.

ABEL D. TYLER, JR., OF BROCKTON, MASSACHUSETTS.

SHOE-TREEING MACHINE.

SPECIFICATION forming part of Letters Patent No. 609,130, dated August 16, 1898.

Application filed September 2, 1897. Serial No. 650,409. (No model.)

*To all whom it may concern:*

Be it known that I, ABEL D. TYLER, Jr., of Brockton, in the county of Plymouth and State of Massachusetts, have invented a new and Improved Shoe-Treeing Machine, of which the following is a specification.

Referring to the accompanying drawings, Figure 1 represents a top view of the last-arm with a last attached. Fig. 2 is a sectional elevation showing the internal mechanism of the last-arm. Fig. 3 is a cross-section on line 3 3 in Fig. 2.

Referring to the drawings, 1 is a last-arm support, and 2 the last-arm, adjustably mounted in said support. The arm 2 is provided with a journal end 3, which is socketed in bearing 4 of support 1 up to its shoulder 5. From journal end 3 an arm 6 extends outwardly, and this arm is screw-threaded at its free end. A collar 7 at the outer extremity of the journal end 3 is held up to the bearing 4, with the bearing between the collar and shoulder 5, by a coiled spring 8 around the arm. The spring is held in place by the slide-washer 9 and screw-nut 10. A lock-nut 11 is conveniently used to keep the screw-nut 10 from turning backward and diminishing the tension of the spring 8. Thus the last-arm is adjustably mounted in its bearing and held therein by tension which may be increased or diminished by turning screw-nut 10. Journal end 3 is formed with a circumferential groove 12, against the bottom of which the inner end of the screw 13, through bearing 4, impinges to prevent the arm moving forwardly in its bearing. The outer end of the last-arm is formed with a spindle-recess 14 and projecting steady-pin 15, the recess to receive the spindle 16 of a last 17 and the steady-pin to enter the hole 18 in the heel part of the last near the spindle to keep the last from turning on the last-arm. The last-arm is provided with a spindle-clutch 19, pivoted at 19* on the arm. The front of the clutch is formed with a hook which engages the notch 20 of the last-spindle to lock the spindle in place on the last-arm. The tail 21 of the clutch rests on a lug 22 of the lever 23, fulcrumed at 24 on the arm. When the lever is thrown back, lug 22 pushes against tail 21 and throws the hooked end of the clutch into engagement with the spindle. A spring 25 coöperates with the lever to hold it in its locking position, the spring in this instance being a leaf-spring, against which the inner end of the lever works, the spring pushing against the lever below its fulcrum when the lever is thrown back into locking position. When the lever is thrown forward to unlock the spindle, the hooked end of the clutch is moved away from the spindle by the spring 26 between the under side of the pin 27, secured in the side of the clutch, and a suitable abutment 28. This spring is compressed by the clutch when the latter is moved to lock the spindle, and expansion of the spring moves the clutch promptly out of engagement with the spindle when the lever is thrown forward.

There are several features of my invention embodied in the treeing-machine shown and described, but not claimed herein, because claimed in my pending application, Serial No. 650,408, of even date.

What I claim is—

1. The combination of a last-arm support; a last-arm journaled therein; a spindle-clutch; a handle engaging with the clutch to lock the spindle, the last-arm being provided with a spindle-recess.

2. The combination of a last-arm support; a last-arm adjustable therein; a spindle-clutch; a spring to return the clutch to inoperative position; a handle engaging with the clutch to lock the spindle, the last-arm being formed with a spindle-recess.

3. The combination of a last-arm support with a rocking last-arm journaled in said support and provided with a rearward arm; a spring thereon and means for keeping the spring under tension; the last-arm being restrained from endwise movement by the spring on one side of the journal-bearing and by abutment of the arm, on the other side of the journal-bearing.

4. The combination of a last-arm support with a last-arm journaled therein; the arm being provided with a spindle-recess; a pivoted clutch; a handle-lever; and a spring therefor; and the handle-lever fulcrumed on the arm and having a lug which engages with the clutch to throw it into locking position.

5. The combination of a last-arm; a spindle-drawing clutch; and a handle.

6. The combination of a last-arm; a pivoted clutch; a pivoted lever having an extension engaging said clutch at one side of the pivot and a spring coöperating with said clutch to move it into inoperative position when the lever is thrown back.

In testimony whereof I have signed my name to this specification, in the presence of two subscribing witnesses, on this 21st day of August, A. D. 1897.

ABEL D. TYLER, JR.

Witnesses:
E. A. ALLEN,
EDWARD S. BEACH.